(No Model.) 3 Sheets—Sheet 1.
C. M. SPENCER.
METAL SCREW MACHINE.
No. 540,928. Patented June 11, 1895.
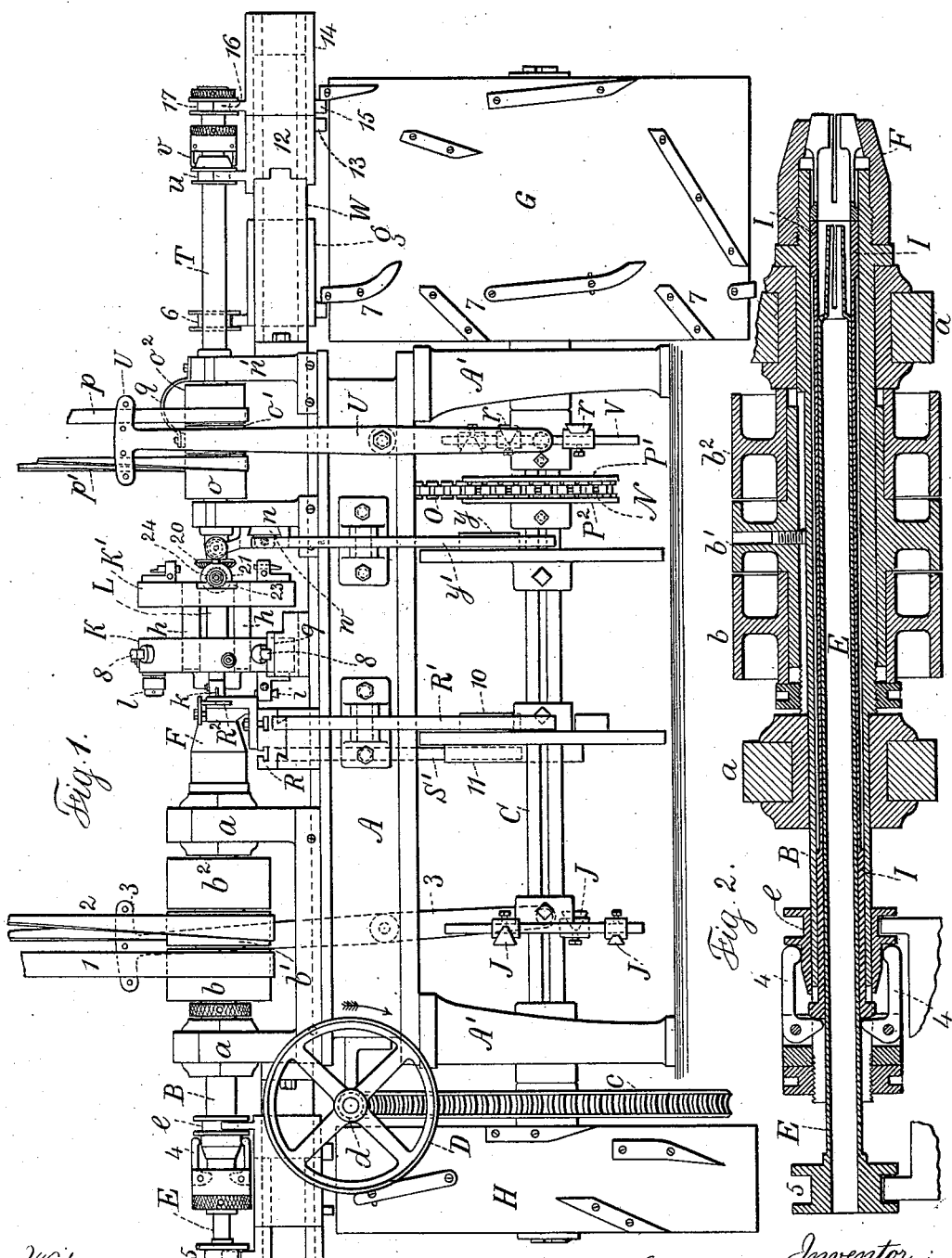
Witnesses:
J. Staib
Chas H. Smith
Inventor:
Christopher M. Spencer
per Lemuel W. Serrell
Atty (No Model.) 3 Sheets—Sheet 2.
C. M. SPENCER.
METAL SCREW MACHINE.
No. 540,928. Patented June 11, 1895.
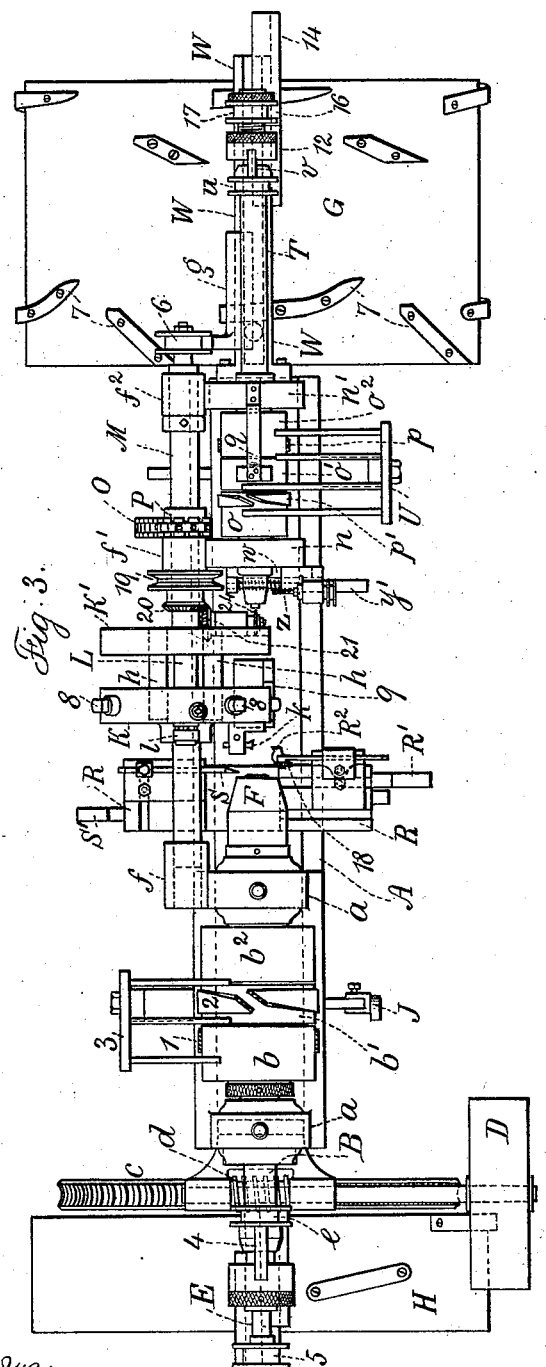
Witnesses:
J. Staib
Chas H Smith
Inventor:
Christopher M. Spencer
per Lemuel W. Serrell
Atty (No Model.) 3 Sheets—Sheet 3.
C. M. SPENCER.
METAL SCREW MACHINE.
No. 540,928. Patented June 11, 1895.
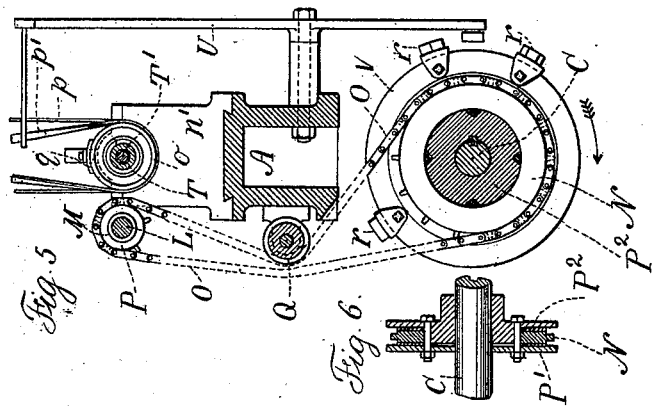
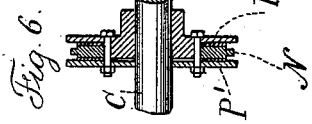
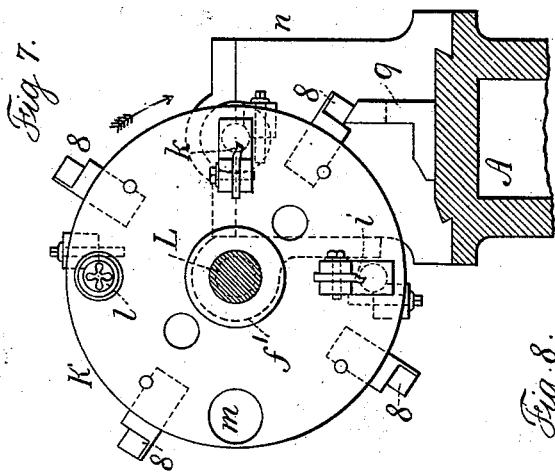
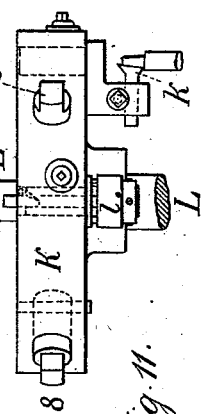
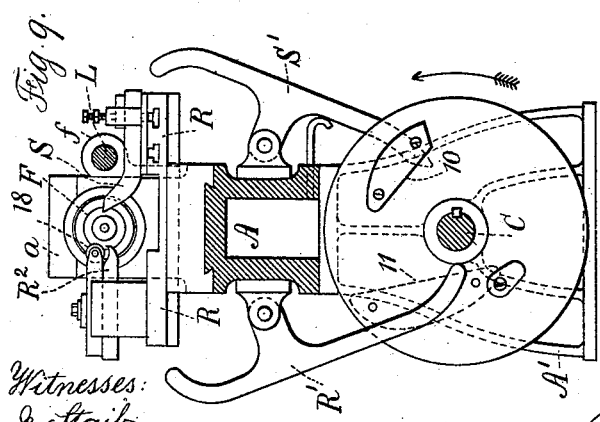
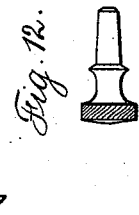
Witnesses:
J. Staib
Chas H. Smith
Inventor:
Christopher M. Spencer
per Lemuel W. Serrell
Atty

UNITED STATES PATENT OFFICE.

CHRISTOPHER M. SPENCER, OF WINDSOR, CONNECTICUT, ASSIGNOR TO THE SPENCER AUTOMATIC MACHINE SCREW COMPANY, OF SAME PLACE.

METAL-SCREW MACHINE.

SPECIFICATION forming part of Letters Patent No. 540,928, dated June 11, 1895.

Application filed October 29, 1894. Serial No. 527,203. (No model.)

*To all whom it may concern:*

Be it known that I, CHRISTOPHER M. SPENCER, a citizen of the United States, residing at Windsor, in the county of Hartford and State of Connecticut, have invented an Improvement in Machines for Making Metal Screws and Similar Articles, of which the following is a specification.

Machines have heretofore been made in which a wire or rod has passed progressively through a tubular spindle provided with a chuck and the projecting end of the wire or rod has been acted upon by turning tools or by a screw cutting die to give shape to the projecting end of the wire or rod and where necessary cut a screw upon the same, and the article has been separated from the rod by a cutter and the operation repeated, but difficulty has been experienced in finishing a two ended article or in properly finishing the screw head and cutting the nick in the same.

The object of the present invention is to combine with the automatic spindle and a progressively rotated turret or tool holder a second spindle in line with the main spindle and adapted to receive the article which has been formed at one end and to present the same to a second set of tools acting upon the article in the opposite direction to either finish the head of the screw and nick the same or to finish the second end of any useful or ornamental article, such for example as a binding post, a stud, a double screw, a knob or other light article.

In carrying out this invention I make use of a turret that is revolved progressively and carries the turning, screw cutting, finishing or other tools and the same is rotated progressively by mechanism hereinafter set forth, and in this turret is an opening that allows the second spindle to be moved up to the article held by the first spindle so as to receive the same as it is cut off and present the other end of the article to the action of tools carried by the turret, and at the opposite side thereof to the tools that act upon the rod or blank in the first instance, and I find it advantageous to employ a supplementary turret that is rotated progressively with the main turret but does not receive an independent movement in the direction of the axis upon which the turret turns.

In the drawings, Figure 1 is a general elevation of the machine. Fig. 2 is a longitudinal section in larger size of the main spindle. Fig. 3 is a plan view. Fig. 4 is a longitudinal and horizontal section through the secondary spindle and through the turret-heads. Fig. 5 is a detached sectional elevation of the chain-wheels for rotating the turret-head. Fig. 6 is a section of the sprocket-wheel upon the driving-shaft. Fig. 7 is an elevation of the main turret. Fig. 8 is a plan view of the same. Fig. 9 is a cross-section of the bed and an elevation of the cam-wheel for actuating the turning or cutting tools. Figs. 10, 11, and 12 are detached views of articles that can be made in this machine.

The bed of the machine is to be of any desired character. I have represented the bed A as upon legs A' and there are bearings $a$ for the main spindle B and upon this spindle B are pulleys $b$, $b'$ and $b^2$. The central pulley $b'$ is fastened to the main spindle and the pulleys $b$ and $b^2$ are loose and a straight belt 1 is provided and a cross belt 2 for these pulleys and a belt shifter 3 actuated as hereinafter set forth so that by moving the two belts simultaneously, the spindle can be rotated in the desired direction, either by the straight belt 1 or by the cross belt 2 the other belt being on one of the loose pulleys $b$ or $b^2$.

Below the bed A and between the legs A' a cam shaft C is supported and upon this is a worm wheel $c$ into which the worm pinion $d$ gears and there is a shaft and driving pulley D for this worm pinion so that the cam shaft C is rotated at the proper speed by a belt to the pulley D, and upon this cam shaft C are drums G and H upon the surfaces of which bars are fastened having the proper shape for giving motion to the respective parts of the apparatus as hereinafter designated, such bars acting as cams to give motion in one direction or the other to the various parts in performing the motions hereinafter set forth.

The main spindle B is constructed substantially the same as the spindles in machines of this general class, that is to say, there is a chuck F at one end and there are two tubes within the main tubular spindle the tube E being a feed tube and the tube I a clamping tube and the sliding conical collar $e$ upon the main spindle B acts upon the bent levers 4 to give end motion to the tube I and clamping jaws of the chuck and cause them to close and hold the rod or wire that is passed through the main spindle and this sliding collar $e$ receives its motion in one direction or the other from cams upon the drum H and there are other cams that give motion to the feed tube E through its collar 5 so that the rod or wire is fed along by the end movement of the tube E when the jaws of the chuck are opened and then such jaws are closed to grasp the article and the feed tube E is drawn back in readiness to again project the wire or rod for the next operation.

The belt shifting lever 3 is actuated by any suitable devices upon the cam shaft C such for example as the belt shifting cams at J. These parts, however, being old do not need further description.

The turret K is made as a head of any desired construction and adapted to carry the various tools needed in the turning, screw-cutting or finishing operations. I have represented this turret K as a circular head upon the shaft L which is supported in the bearings $f f'$ and $f^2$ and I have shown a second turret head K' permanently fastened upon the tube M which surrounds the shaft L and is supported in the bearings $f'$ and $f^2$, and the shaft L to which the turret K is permanently attached can be moved endwise through this turret tube M by the action of cams upon the cam drum G there being a spool or collar 6 at the end of the shaft L and a slide box $g$ with a downwardly projecting stud to be acted upon at the proper time by one of the cams 7 upon the drum G to give end motion to the shaft L and the turret K at the proper time for bringing the respective tools carried by such turret into action. The studs $h$ permanently fastened to the secondary turret head K' and passing through holes in the turret K cause these two turrets K and K' to be rotated progressively together and to be stopped in their rotation, and while the secondary turret head K' only has a progressive rotation the turret head K has a movement in the direction of its axis in addition to the said progressive rotation, and I provide upon the turret K projecting stops 8 and upon the bed A a stop or arrester 9 with which the stops 8 come into contact successively and they are held in contact by the rotating device hereinafter described, and when the shaft L receives an endwise movement by its collar 6 and the cams that act upon the same, the turret head is moved in the same direction so as to draw the stop 8 that is in contact with the arrester 9 along upon the top and parallel edge of such arrester until the stop clears the end of the arrester and the turret can be rotated and it receives an end movement so that the next stop 8 engages the top of the arrester and stops the movement of the turret with the proper tool in line for acting upon the article that is to be made.

It will be observed that in consequence of the stops 8 being more distant from the shaft L than the tools that are carried by the turret K there is little or no risk of the turret being misplaced or of the tool vibrating or cutting irregularly because the arrester 9 forms a firm bearing for the stop 8 and the rotating device is acting continuously to press the stop 8 into contact with the arrester.

In order to rotate the turret progressively I place upon the cam shaft C a sprocket wheel N with a chain O leading to the sprocket wheel P upon the turret shaft L and there is a guide wheel Q to keep the chain from contact with the bed of the machine, and the sprocket wheel N is between two flanges P' and P², the flange P² having a hub fastened on to the cam shaft C and the flange P' being in the form of a disk that can be set up by bolts so as to apply friction to the sprocket wheel N through intermediate washers of leather or similar material so that the parts P' and P² continue to rotate but the sprocket wheel N will remain stationary so long as the stop 8 is in contact with the arrester 9, and the direction of rotation is such that the chain will tend to keep the stop 8 firmly against the arrester 9 and the turret will turn as soon as the end movement of the shaft and turret causes the stop 8 to slip off the end of the arrester 9.

The turret K may receive and present any desired number of tools. I have represented four stops 8. At $i$ a turning tool is represented and at $k$ a smoothing tool and at $l$ a screw cutting die is shown and at $m$ there is an opening through the turret for the purpose hereinafter set forth; and it is to be understood that tools carried by the turret are to be of any desired character according to the work to be performed. I also provide a tool holding slide R with tools R² standing in one direction and a second tool S standing in the other direction and these are actuated by levers R' and S' and cams 10 and 11 upon a cam disk or wheel on the shaft C.

It will now be understood that the wire or rod to be turned and shaped is passed into the main spindle B and it projects beyond the end of the clamping tube and chuck head the necessary distance for the article to be made and it is turned and smoothed by one or more tools ($i$ and $k$) and subjected to the action of the screw die $l$ where there is to be a screw thread cut upon the article, and when the turret head K comes around so that the opening $m$ is in line with the main spindle, the secondary spindle next described is projected so as to pass into or through the turret head K more or less and grasp the article that has been partially made before the same is finally cut off and separated from the rod or wire, and then the operations are repeated. The secondary spindle T is supported in the bearings $n$ $n'$ and between these bearings are the pulleys $o$ $o'$ and $o^2$ and the central pulley $o'$ has a key or screw passing into a longitudinal groove in the secondary spindle so as to rotate this secondary spindle but allow for the said spindle being moved endwise through its bearings $n n'$, and the straight belt $p$ and cross belt $p'$ are driven as usual and the belt shifter U is adapted to move these belts together and they are at a sufficient distance apart and the pulleys $o$ and $o^2$ are sufficiently long to allow for the belts being off the pulley $o'$ and only upon the pulleys $o$ and $o^2$. Hence the secondary spindle will remain quiescent when the belts are in the positions shown in Figs. 1 and 3, and there is a friction pad upon a spring arm as represented at $q$ to rest upon the pulley $o'$ and steady the spindle and prevent it accidentally rotating, and when the belt shifter is moved in one direction the secondary spindle T is rotated in one direction, and when the belt shifter is moved the other way the secondary spindle is revolved in the opposite direction, and upon the cam shaft C is a disk or wheel V upon the edges of which the belt shifting inclines $r$ are clamped so that these can be placed in any desired position and act to give rotation through the belts to the secondary spindle T in the proper direction and at the proper time according to the positions of such inclines $r$ upon the cam wheel V, and I remark that it is to be understood that the cam shaft C makes one complete rotation during the time that an article is entirely finished.

At the inner end of the secondary spindle T there is a chuck $s$ which is adapted to receive the screw or other article to be acted upon, and the secondary spindle T is tubular and has within it a rod T' that acts to close the chuck S upon the article to be grasped when the rod is moved toward the chuck, and when this rod T' is drawn back the chuck is opened and a spring or plunger $t$ within the chuck S acts to eject the screw or other article that has been finished in the chuck of the secondary spindle, and upon the rear portion of the secondary spindle is a sliding collar $u$ acting upon the bent levers $v$ to give motion to the rod T' for opening or closing the chuck and this collar $u$ is acted upon by a fork or stud upon the slide box 12 that receives its motion from one of the cams upon the cam drum G acting against a stud 13 on said slide box 12; and it is to be understood that the cam upon the cam drum G that acts upon the collar $u$ is properly placed with reference to the opening and closing of the chuck.

The slide box 12 is upon a slide W that is connected with and projects from the main frame of the machine advantageously from the bearing $n'$ and upon the same slide is a slide box 14 with a stud 15 that is acted upon by cams upon the drum G and has a fork or stud 16 engaging the collar or spool 17 upon the back end of the secondary spindle T, and by this means said secondary spindle receives an endwise movement in one direction or the other at the proper time, the cams upon the drum G being shaped and placed so as to give the movement necessary; and it will be observed that the slide box 14 comes up against the slide box 12 so that said boxes 12 and 14 move together under the action of any cam which gives end motion to the secondary spindle T toward the main spindle B thereby insuring the holding of the article by the closed chuck and when the secondary spindle is to be drawn away from the main spindle, the slide box 12 can be acted upon by a cam, and in so doing the chuck will retain its hold upon the article and the spindle T will be moved endwise in consequence of the slide box 12 moving the slide box 14 and the chuck will be opened by the slide box 12 being moved by a pointed cam passing between the studs 14 and 15 to withdraw the conical collar $u$ from engagement with the bent levers $v$, or the chuck can be opened by the collar $u$ and slide box 12 remaining stationary while the secondary spindle T is drawn back by the action of a cam upon the slide box 14; and it will be observed that the collar or spool 17 is adjustable upon the secondary spindle T and so also is the collar carrying the pivots of the bent levers $v$ so that the relative positions of these parts upon the secondary spindle can be readily adjusted to insure the opening and closing of the chuck at the desired times and for insuring accuracy in the end movements at the proper times of the secondary spindle. It will now be understood that the secondary spindle receives an end movement at the proper time when the opening $m$ in the turret head K is in line with the spindle so as to grasp and take the article that has been partially made while being rotated by the main spindle and draw such article back through the opening $m$, and thereafter the exposed end of the article can be acted upon by any desired tools.

In manufacturing some kinds of articles the secondary turret head K' may not be necessary because tools can be mounted upon the back of the turret head K as well as upon the front and in that instance the secondary spindle will be moved endwise and either rotate or not in presenting the projecting end of the article to the action of such tools, but usually it is advantageous to employ the secondary turret head K' the same being rotated progressively along with the turret head K as aforesaid but not receiving a motion endwise of its axis because the end motion given to the secondary spindle renders it unnecessary to give an endwise movement to the secondary turret, and upon this secondary turret any turning, boring, shaving or smoothing tools appropriate for the article can be mounted and where a screw threaded socket is to be formed, as illustrated in Fig. 11, one tool will be employed to bore the hole and a tap to cut the screw thread, and if the head of the screw is to be knurled, as illustrated in Fig. 12, there may be a knurling tool upon the secondary turret or the knurling tool may be provided as illustrated at 18 Fig. 9 the same being supported by the tool slide R.

In Figs. 1, 3 and 4 I have represented a device for sawing the nicks or channels in the screw heads, the same consisting of a pulley 19 that is loose around the sleeve M and it is provided with a bevel gear 20 driving a similar gear 21 upon a shaft 22 supported by a bearing 23 upon the turret K' and provided with a saw 24. By this means the saw can be continuously revolved and when the turret head has been turned to bring the saw into position for use, the screw is moved endwise against the saw by the action of a cam upon the drum G moving the secondary spindle T and the screw is carried by it toward the saw.

It is to be understood that the tools represented upon the turret heads are illustrative and they are to be varied according to the article to be produced, and such tools should always be set in such a manner upon the turret head that the turning, drilling or cutting operation will tend to press the stop 8 upon the arrester 9 and thereby there will not be any risk of vibration in the turret head.

It is sometimes advantageous to be able to bore a hole transversely in the article that is being made or to cut a screw thread in such hole or to apply a knurling or other tool at the side of the article as it is in the secondary spindle. With this object in view a sliding rest $w$ is connected with the machine preferably upon the bearing $n$, and the slide of this rest is moved by a suitable cam $y$ acting upon a lever $y'$ so as to move the slide and the tool carried by it at the proper time, and when this tool has a drill, the slide is provided with a bearing for such drill $z$ and there is a pulley on the drill stock to be run by a belt. Hence the drill can be projected to act laterally upon the article and if desired a tap for cutting a screw thread may be similarly brought into action; or a knurling tool brought up by the slide rest may be applied against the side of the article that is being made while the secondary spindle is being rotated to transfer the ornamentation or knurl to such article.

I claim as my invention—

1. The combination with the main spindle and the turret for holding tools and means for turning such turret progressively, of a secondary spindle in line with the main spindle, a chuck for receiving the article from the main spindle and means for giving to the secondary spindle the required movements, substantially as set forth.

2. The combination with the main spindle and the turret for holding tools and means for turning such turret progressively, of a secondary spindle in line with the main spindle, a chuck for receiving the article from the main spindle and means for giving to the secondary spindle the required movements, and a secondary turret moving with the main turret and adapted to receive tools for acting upon the article presented to them by the secondary spindle, substantially as set forth.

3. The combination in a machine for making screws and other articles, of two spindles in line with each other and provided with chucks, one spindle being hollow and adapted to receive through it the rod or wire to be acted upon, a turret head for carrying the tools made use of, a stop projecting from the periphery of the turret head and a stationary arrester for the stop, means for rotating the turret progressively and for giving end motion to such turret to clear the stop from the arrester, substantially as set forth.

4. The combination with two spindles in line with each other and having chucks at their adjacent ends, of two turrets, a shaft upon which one turret is secured and means for giving end motion to such turret, a tube around the shaft and a secondary turret carried by such tube, means for rotating the tube and its turret and a connection from the same to rotate the shaft and the main turret, substantially as set forth.

5. The combination with the main spindle, of a turret, a shaft for supporting the same, means for giving end motion to the shaft, a sprocket wheel and chain and a driving sprocket frictionally connected with its driving shaft and stops on the turret and an arrester whereby the friction applied to the chain wheel holds the stop against the arrester during the action of the tool upon the turret, substantially as set forth.

6. The combination with a turret for holding tools and its shaft, means for rotating the same and for giving an end movement to the shaft, of a main spindle and its chuck, mechanism for rotating the same and for feeding the wire or rod through the chuck progressively, a secondary spindle in line with the main spindle, means for giving an end movement to the secondary spindle, a tight pulley and loose pulleys at the opposite sides of the tight pulley, a straight and cross belt, a belt shifter, a cam shaft and cams for actuating the belt shifter for rotating the secondary spindle in either direction or allowing it to remain quiescent while the tools are acting upon the article carried by such secondary spindle, substantially as set forth.

7. The combination with a turret for holding tools and its shaft, means for rotating the same and for giving end movement to the shaft, of a main spindle and its chuck, mechanism for rotating the same and for feeding the wire or rod through the chuck progressively, a secondary spindle in line with the main spindle, means for giving an end movement to the secondary spindle, a tight pulley and loose pulleys at the opposite sides of the tight pulley, a straight and cross belt, a belt shifter, a cam shaft and cams for actuating the belt shifter, for rotating the secondary spindle in either direction or allowing it to remain quiescent while the tools are acting upon the article carried by such secondary spindle, and a friction pad for arresting the movement of the tight pulley when the belts are out of contact with the same, substantially as set forth.

8. The tubular secondary spindle and its bearings or supports in combination with a tight pulley having a screw or key entering a longitudinal groove in the tubular spindle, loose pulleys at opposite sides of the tight pulley and between the bearings for the spindle, means for giving an end motion to the secondary spindle, a chuck at the end of the secondary spindle, a rod within the spindle and means for actuating the same to open and close the chuck and a turret head and means for revolving the same progressively to bring the tools held by such turret into position for acting upon the article carried by the chuck of the secondary spindle, substantially as set forth.

9. The combination with a spindle having a chuck and means for rotating the spindle and for giving to the same a longitudinal movement, of a turret means for rotating the same progressively, a circular saw and its shaft carried by such turret, a pulley around the axis of the turret and bevel gear connecting the pulley and the shaft of the circular saw, substantially as set forth.

Signed by me this 22d day of October, 1894.

CHRISTOPHER M. SPENCER.

Witnesses:
GEO. T. PINCKNEY,
S. T. HAVILAND.